United States Patent [19]

Schutte

[11] 4,358,206

[45] Nov. 9, 1982

[54] DRAFT TUBE APPARATUS

[75] Inventor: Marlin D. Schutte, Rochester, N.Y.

[73] Assignee: General Signal Corporation, Rochester, N.Y.

[21] Appl. No.: 221,243

[22] Filed: Dec. 30, 1980

[51] Int. Cl.$^3$ .............................................. B01F 5/12
[52] U.S. Cl. ................................................... 366/262
[58] Field of Search ............... 366/134, 137, 150, 182, 366/262, 264, 266, 270, 305, 306; 415/52, 53 R; 210/197; 209/159, 465, 494, 505

[56] References Cited

U.S. PATENT DOCUMENTS 3,737,288  6/1973  Hochman ......................... 366/270 X
3,893,920  7/1975  Hubbard et al. ..................... 210/197

*Primary Examiner*—Philip R. Coe
*Attorney, Agent, or Firm*—Martin Lukacher; Jeffrey S. Mednick

[57] ABSTRACT

Improved draft tube mixing apparatus having one or more of the following features: (a) controlled circulation at the inlet of the tube which allows operation at reduced submergence by preventing formation of a vortex; (b) an additional passage for controlled flow into the draft tube along its length to allow operation without the tube being entirely submerged; (c) the recovery of dynamic energy from the flow at the outlet of the tube by wide area diffusion without separation from the walls of the tube in the diffusing region thereof; (d) improved guidance of radially directed to axially directed flow at the inlet of the draft tube for efficient axial pumping by the impeller by maintaining generally uniform axial flow velocity radially of the impeller; and (e) separation of coarse and fine particles in suspension in the tank to allow selective draw-off of the coarse and/or fine particles thereby increasing efficiency of mixing.

7 Claims, 13 Drawing Figures

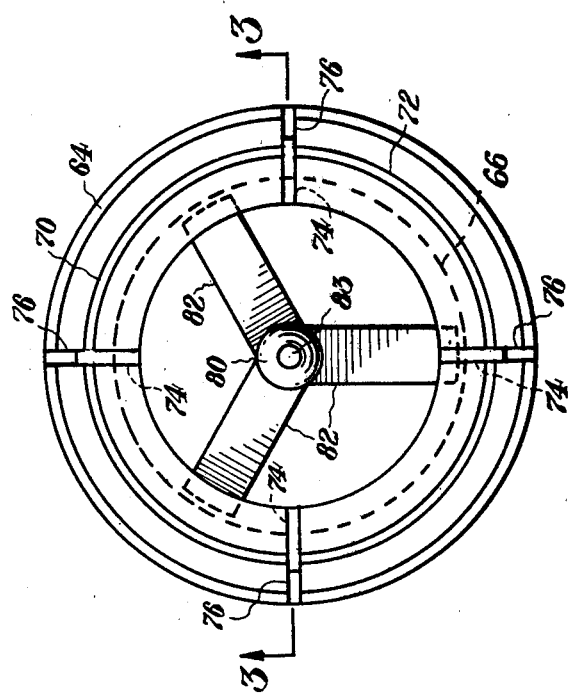
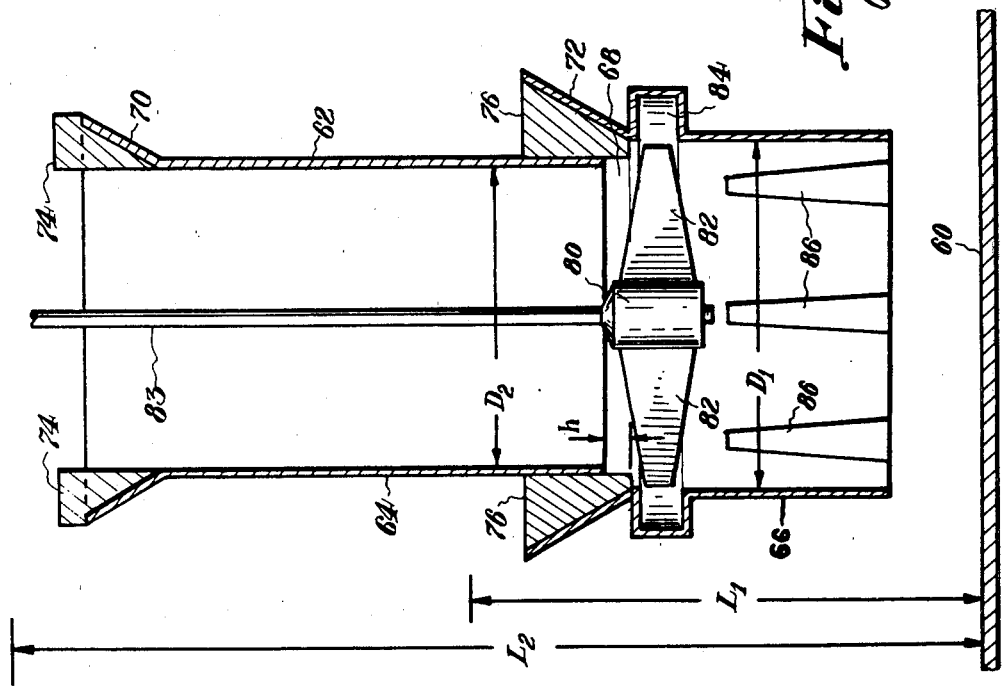

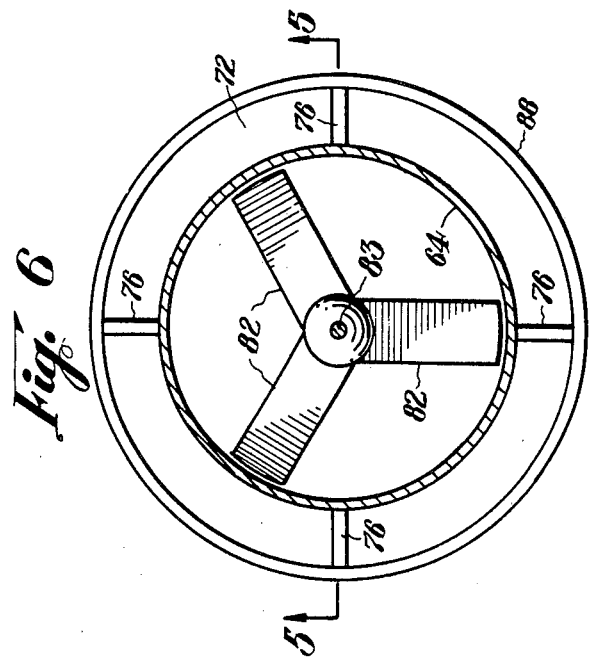
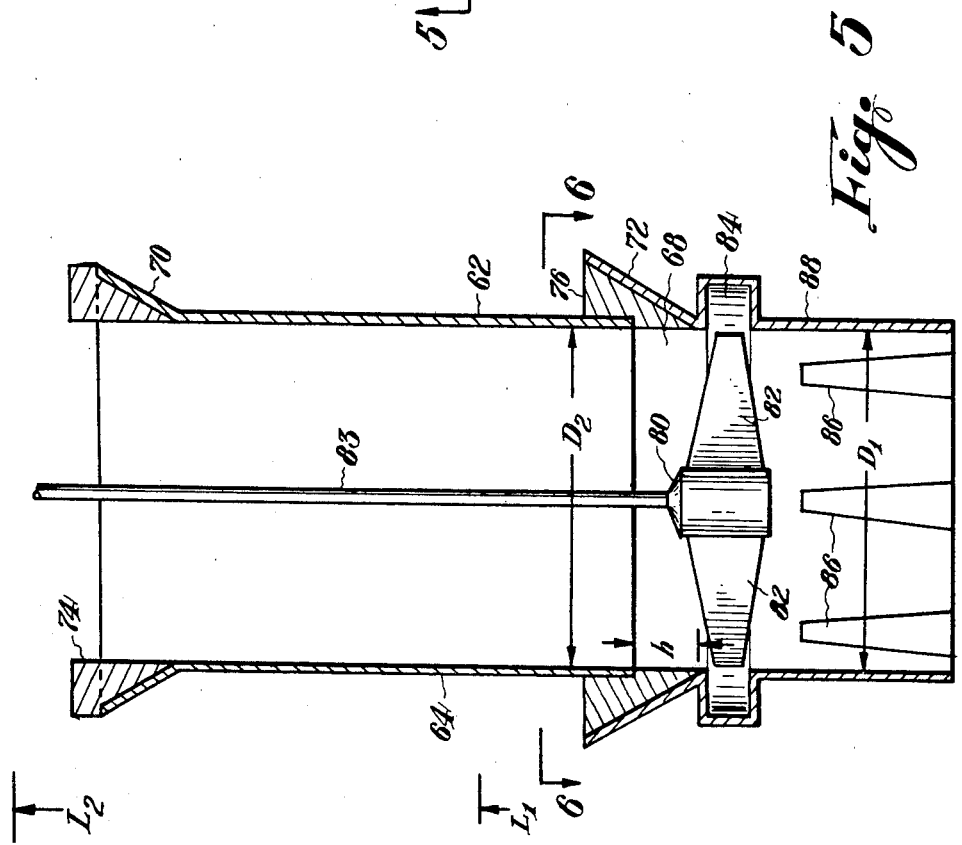

DRAFT TUBE APPARATUS

DESCRIPTION

The present invention relates to draft tube mixing apparatus for mixing of liquids and particularly of liquids having particles suspended therein.

Draft tube mixing apparatus in accordance with the invention is especially suitable for use in industrial processes for the treatment and conversion of chemicals and minerals, such for example as bauxite into alumina. Draft tube mixing apparatus in accordance with the invention will be found generally useful in many materials treating processes, such as for waste water and sewage sludge, as well as in chemical processes.

Draft tube mixing apparatus has been in use in order to provide controlled flow of liquids, including liquid-particle suspensions, for thorough and effective mixing thereof. Features of draft tube mixing apparatus have been described in U.S. Pat. Nos. 3,477,382 and 3,532,327; namely, a way for the axial flow impeller used in the draft tube to improve the pumping operation thereof, and particle clearing slots which facilitate start-up of the mixing apparatus in settled solids.

It is desirable to increase the efficiency and flexibility of draft tube mixing apparatus. By increasing the efficiency of the apparatus, the power needed to drive the impeller can be reduced thereby decreasing the cost of energy for the process which involves the use of a draft tube mixer. Increased flexibility in the use of draft tube mixers involves operation at low liquid levels, such with short tanks, with up-pumping as well as down pumping through the draft tube, and with the ability to separate particles of selected size during mixing operations. Flexibility of the draft tube mixing apparatus is also desirable during a process emergency or upset, where the liquid level in the tank drops below the top of the draft tube leaving it only partially submerged. It is desirable in such emergency conditions, as well as in process start-up or shut-down, that the mixing action begin or be maintained with the level in the tank below its normal operating level.

In a down pumping draft tube mixer, the level of the liquid in the tank must be monitored. If the level is low, a vortex may be generated at the inlet resulting in reduced flow and inefficiency of operation. It is therefore desirable to allow operation at reduced levels close to the inlet of the draft tube to reduce the monitoring required and to tolerate process variations.

When the level of the liquid drops below the tube, normal mixing ceases, and more liquid must be added before circulation in the tank and mixing action can start-up. During a process upset or emergency condition, and also during process shutdown, the liquid level may fall below the top of the tube. Maintaining mixing operations during such conditions without significant reduction in mixing action or efficiency that exists when the liquid level is normal is a problem, and facilities for operation at less than normal levels of liquid in the mixing tank have not heretofore been provided in draft tube mixing apparatus.

Draft tube mixers of the type which are generally available utilize deep mixing tanks necessary to accommodate long draft tubes; that is draft tubes having a high aspect ratio of length to diameter. A short draft tube of large diameter allows the use of a large diameter impeller which can be more efficient in terms of the flow to input power ratio thereof. It is however desirable that the flow from the outlet of the draft tube diffuse so as to reduce the flow velocity and increase the efficiency. Losses are proportional to the square of the flow velocity and are exacerbated where the direction of the flow changes, as from axially downward to axially upward flow in a down pumping draft tube mixer. The diffuser in draft tubes have heretofore been long in order to prevent the separation of the flow at the interior wall of the tube. The detachment of the jet from the interior wall of the draft tube results in a separated, high pressure region where the flow has low velocity. Pumping with such a separated jet is very inefficient in terms of the impeller drive power necessary to maintain the necessary flow and mixing action. Accordingly diffusers have been provided with low angle, usually about four degrees in the angle between the outer periphery of a diffusing cone and the axis of the draft tube. It is of course desirable, in order to gain efficiency of operation, as well as the flexibility of allowing the use of a short draft tube, to increase the allowable diffusion angles without engendering separation of the jet from the interior wall of the draft tube.

Radical changes in flow direction at the inlet end of the draft tube give rise to inefficient operation due to flow separation and at times reverse flow conditions along the interior wall of the draft tube. A uneven flow velocity distribution through the impeller region results because of such separation effects. Various flow guides, such as flares and rims of teardrop configuration, at the inlet end of the draft tube have been resorted to. While such constructions have been satisfactory for many applications, an improved inlet structure which improves the flow distribution through the impeller region and avoids separation effects is desirable, particularly for draft tube apparatus which is operative in an up pumping direction through the draft tube so as to allow the tubes to be located close to the bottom of the tank where the radial velocity is highest.

It has been found that particles in a liquid-particle suspension distribute themselves according to size between the draft tube and the wall of the tank. The efficiency of the total process can be enhanced by utilizing the stable flow pattern induced in the draft tube mixer and selective draw-off which advances course particles in one direction and fines (fine particles) in the other direction. The size of the particle which is desired to be selected depends upon the process in which the draft tube mixing apparatus is used. In some processes, mixing results in the reduction of the initial particle size and in other processes the particles grow in size to reach the desired size. In either case the removal of particles of desired size and the recirculation of particles which have not reached the desired size tends to enhance the efficiency of the mixing operation. Simplification of the process also results since additional apparatus for selecting and screening particles of correct size do not need to be used.

It is an object of the present invention to provide improved mixing apparatus having one or more features of operation which meet the needs or solve the problems mentioned above.

It is a further object of the present invention to provide approved draft tube mixing apparatus having features of efficiency of operation in terms of the energy needed to operate the apparatus and the flexibility to facilitate use in many applications where mixing of materials, such as liquids and liquid-particle suspensions, is desired.

Briefly described, draft tube mixing apparatus, that operates with liquid levels approaching the inlet of the tube and avoids the formation of a vortex, makes use of a member which is disposed in the tank with the draft tube and has a mass such that it floats at the surface of the liquid in the tank. Means are provided for maintaining the floating member in the flow path of the liquid into the inlet of the tube so as to control the flow of the liquid in a manner to prevent the vortex from being formed.

Draft tube apparatus which allows operation at different liquid levels, one of which is below the top of the tube makes use of a passage into the tube which may be defined by a pair tube sections which are axially moveable with respect to each other. The passage into the tube is exposed above the impeller therein to provide a path for liquid into the tube and the tank at a level substantially below the upper end of the draft tube.

Briefly described, a draft tube which may be made relatively short includes means therein for diffusing the flow produced by the impeller. In the diffusing means is included means for controlling the flow in an axial direction to prevent the establishment of a region of high pressure and low flow velocity around the periphery of the diffusing flow in the diffusing means. The latter may be implemented by means of a conical member which enters into a conical diffuser and controls the flow therein so as to enable the diffuser to have a wide angle, for example about 35 degrees, with respect to the axis of the draft tube, thereby reducing the velocity in a short length and making a short draft tube feasible.

In order to provide draft tube mixing apparatus capable of receiving high velocity flow which enters the inlet from a radial direction, flow guide means is disposed at the inlet region of the draft tube to change the direction of flow in the region from radially to axially directed flow of generally uniform velocity. The guide means comprises an annular member having a cylindrical section extending axially into the draft tube at the inlet thereof and a section extending outwardly from the draft tube inlet and away from the tube; the latter section desirably having a conical portion with a disc shaped portion extending therefrom so as to be of a shape generally similar to a stove pipe hat with the top of the stove pipe removed.

Briefly described, draft tube apparatus for mixing a liquid-particle suspension and separating particles of selected size makes use of a draft tube which is submerged under the suspension in a tank containing the suspension. The draft tube has an impeller which provides axial flow to provide agitation and flow through the tank. This flow is in opposite directions within and outside of the tube. There exists first and second regions respectively between the inlet of the tube and the wall of the tank and between the outlet of the tube and the wall of the tank where the flow changes direction. One or more draw pipes are disposed in these regions. The portion of the suspension carrying generally coarse particles is obtained by the pipe which is located in the region near the outlet of the draft tube, and a portion of the suspension carrying generally fine particles is obtained from the pipe in the region near the inlet of the draft tube. Either the coarse or fine particles may be advanced or returned in a series of mixing tanks. This selective recirculation and advance improves the efficiency of the total process.

The foregoing objects, features and advantages of the invention as well as presently preferred embodiments thereof will become more apparent from a reading of the following description in connection with the accompanying drawings in which:

FIG. 3 is a simplified, schematic, cross-sectional view showing draft tube mixing apparatus which allows operation at different levels one of which is well below the top of the tube;

FIG. 4 is a top view of the apparatus shown in FIG. 3;

FIG. 5 is a view similar to FIG. 3 of draft tube mixing apparatus operative with liquid levels above and below the top of the tube;

FIG. 6 is a sectional view taken along the line 6—6 in FIG. 5;

Figure 12:
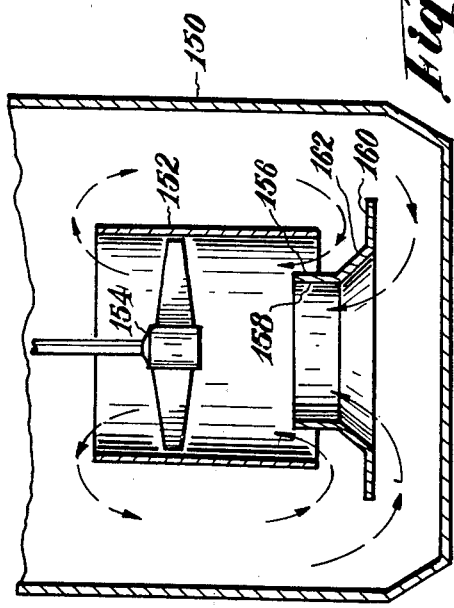
Figure 13:
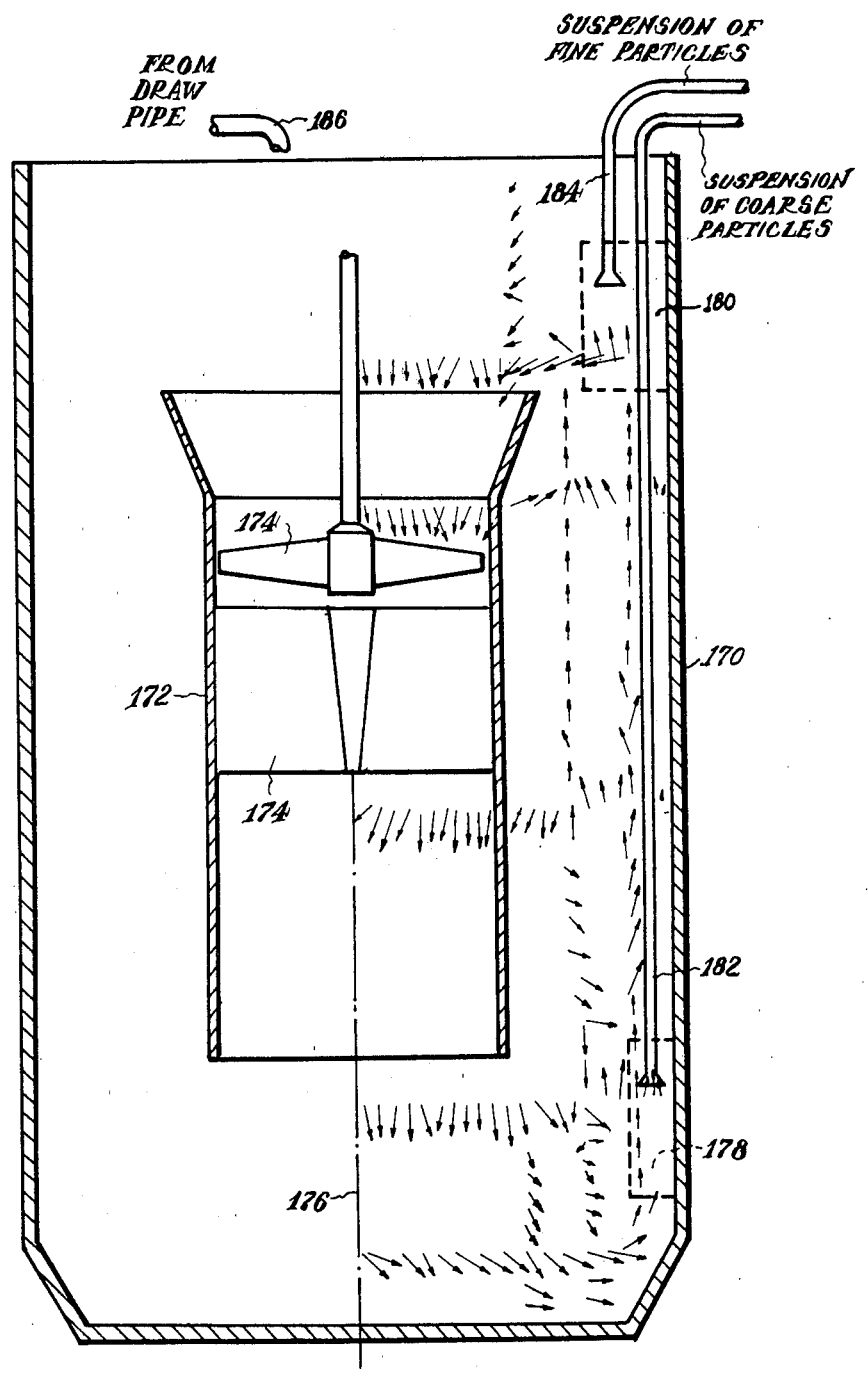

FIG. 12 is a simplified cross-sectional view of draft tube mixing apparatus wherein the liquid is pumped upwardly through the draft tube and has flow guide means for controlling the flow distribution and enhancing the efficiency of operation thereof; and FIG. 13 is a simplified, schematic cross-sectional view of draft tube mixing apparatus having means for the separation of portions of a liquid-particle suspension which carries fine particles and coarse particles.

Figure 1:
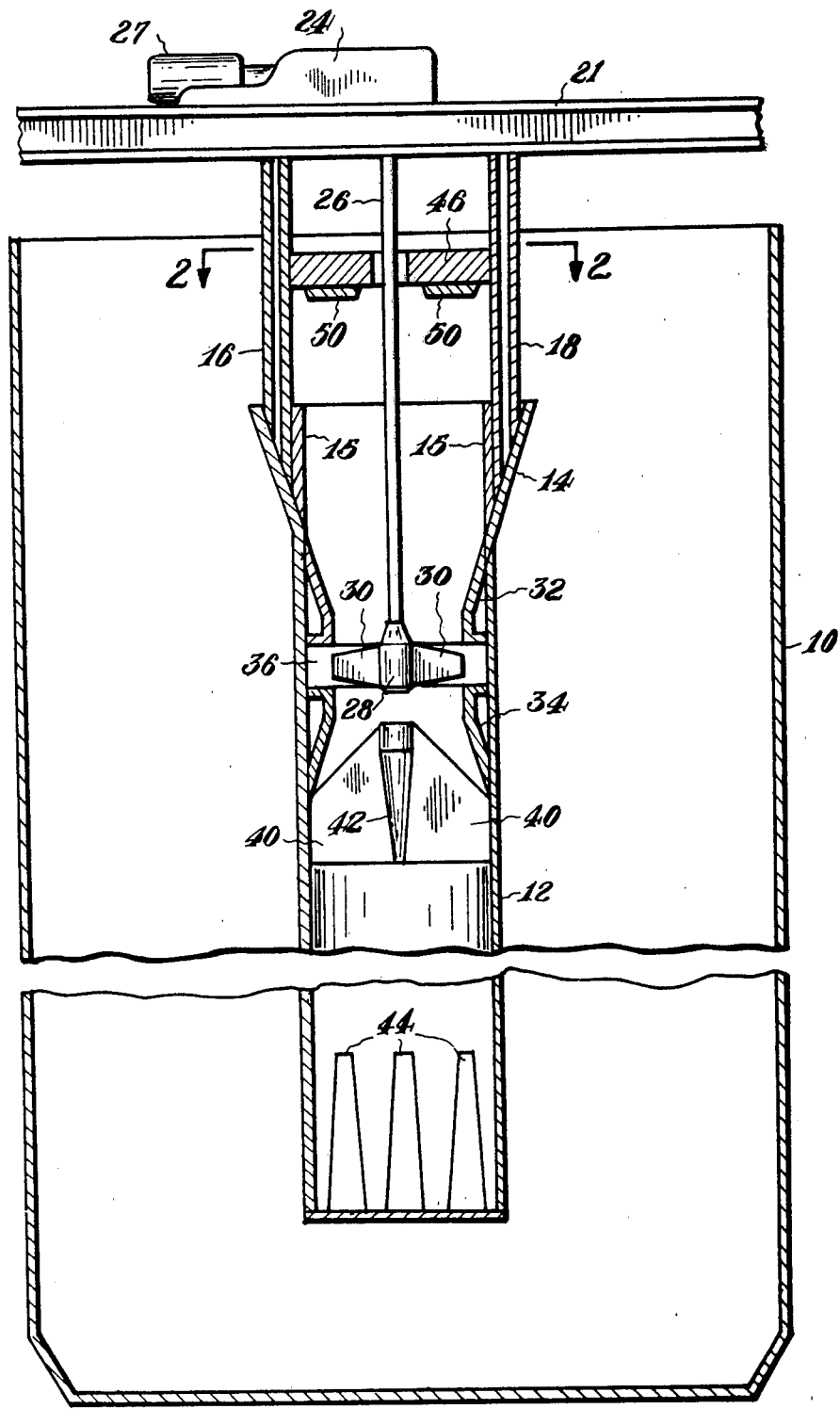
FIG. 1 is a schematic, sectional view taken along a diameteral plane through draft tube mixing apparatus wherein operation near the inlet of the draft tube is obtained by preventing the formation of a vortex.
Figure 2:
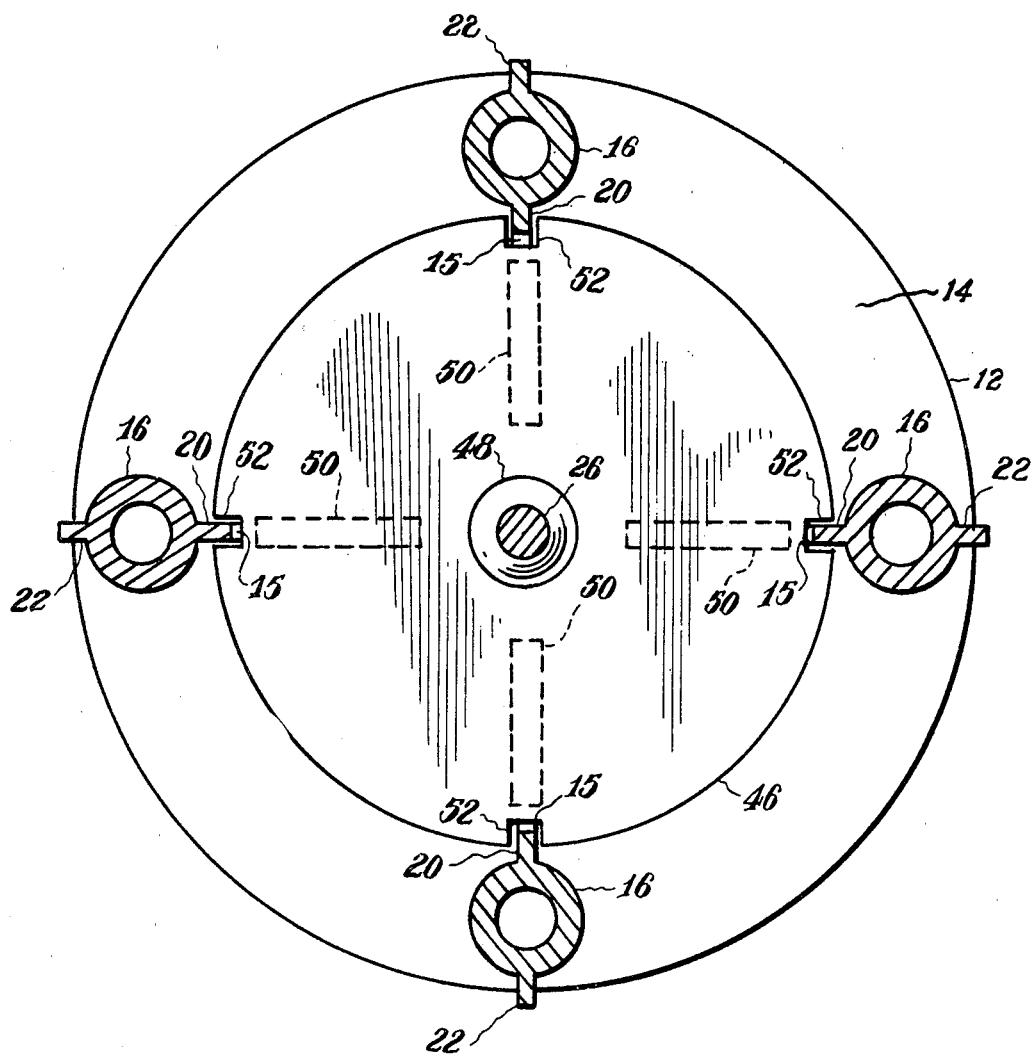
FIG. 2 is a sectional view of the apparatus shown in FIG. 1, this section being taken along the line 2—2 in FIG. 1.

Referring to FIGS. 1 and 2, there is shown a tank 10 containing a liquid which is to be mixed. The term liquid as used herein means the material in the tank which to be mixed and may be a liquid-particle suspension, which is also known as a slurry, containing both solid and liquid material.

A draft tube 12 is disposed centrally in the tank. For example, when the tank is cylindrical and the draft tube is a cylinder, the axis of the tank and the axis of the tube 12 may coincide, as shown. Other arrangements may be used.

The tube 12 has a flared or conical inlet section 14 in which there are disposed four radial extending inlet vanes 15 which are 90 degrees apart. These vanes, are located diametrically opposite to each other. Four struts 16 support the draft tube 12 from a beam 21. These struts are tubular and intersect the vanes 15. As shown in FIG. 2, the struts 16 have longitudinal flanges 20 and 22. One of these flanges 20 provides a key.

The beam 20 and other support structure, which is not shown to simplify the illustration, carries a drive assembly 24 including an electric motor 27 and gears. An impeller assembly is supported by the drive 24. This assembly includes a shaft 26 which is coaxial with the draft tube 12. A hub 28 is connected to the shaft and a plurality of impeller blades 30 are connected to the hub. These blades may be three in number, 120 degrees apart. Other arrangements of blades may be used.

Conical members 32 and 34 are spaced from each other to define an impeller way 36. This way is of a design described in above referenced U.S. Pat. No. 3,477,382.

Below the impeller are vanes 40, which may be four in number, 90 degrees apart. These vanes are connected between the inner wall of the draft tube 12 and a diffusion cone 42 which flares downwardly. The cone is coaxial with the draft tube and the wall of the cone defines a narrow, acute angle, for example, 7 degrees, with the axis of the draft tube. The outlet end of the draft tube may be provided with a plurality of solid resuspension slots 44, which are described in detail in the above referenced U.S. Pat. No. 3,532,327.

Floating on the free surface of the liquid in the tank is a floating body or member 46. The member is annular in shape. Particularly, the floating member is a ring having an outer diameter approximately equal to the inner diameter of the draft tube 12. The shaft 26 extends through a circular hole 48 in the floating ring 46. The diameter of the hole 48 is larger than the diameter of the shaft 26.

A plurality of radial vanes 50, suitably four in number, 90 degrees apart as shown in FIG. 2, are disposed radially on the underside of the ring 46 which faces the inlet of the draft tube 12. These vanes 50 assist the floating ring in controlling the circulation of the liquid and particularly the flow into the inlet of the draft tube.

Notches 52, ninety degrees apart, are cut into the right 46 and function as key ways. The inlet vanes 15 engage the ring 46 at the key ways, and the ring 46 is maintained centered over the inlet of the draft tube 12. This structure also prevents the ring 46 from rotating.

Other support and guiding structures for the ring 46 may be provided. For example, lines, such as wire ropes having turnbuckles therein maybe connected to the ring 46 and adjusted to maintain the clearance between the shaft 26 and the hole 48 in the ring 46. In the event that the level of the liquid surface in the tank does not change sufficiently to loose the clearance between the shaft 26 and the hole 48, the lines and turnbuckles may be sufficient. However, if a larger change in the level of the liquid is anticipated, it may be desirable to include springs in the lines or spring loaded reeling mechanisms for the lines in order to pay out or take up slack so as to maintain the ring 46 in centered position as the level of the liquid changes.

In operation, the vanes 50 on the floating ring 46 prevent a rotating flow of the liquid from developing at the free liquid surface over the inlet to the draft tube 12. The draft tube 12 may be operated for down pumping; that is the impeller is rotated so that the liquid flows axially downward through the tube 12. The ring 46 with the vanes 50 extending downwardly therefrom allows the liquid level in the tank 10 to drop so that the draft tube operates at a reduced submergence. The ring 46 and vanes 50 prevent the development of circular rotation in the liquid as it is drawn into and pumped down the draft tube 12. Undesirable vortex effects are therefore avoided. A vortex would upset the flow so that the flow would not be distributed uniformly across the impeller blades 30. The blades would then operate at low efficiency and more power would be required from the motor to drive the necessary flow through the tube 12. The energy cost of operating the draft tube mixing apparatus would therefor be increased in the presence of the vortex flow into the draft tube. Also a vortex tends to entrain air into the liquid which further disturbs the flow and may be undesirable for the chemical process which is carried on in the mixing tank 10.

The circulation flow control provided by the floating ring or disc 46 enables the draft tube mixer to operate over a wide range of liquid levels for efficient utilization of energy during such operations.

Although the apparatus shown in FIGS. 1 and 2 is particularly adapted for down pumping through the draft tube 12, the floating ring arrangement may be used for up pumping where the impeller rotates in a direction to cause axial flow upwardly through the draft tube. Also while the diameter of the ring 46 is preferably approximately equal to the inner diameter of the draft tube below the conical section 14 thereof, the diameter of the ring may be somewhat larger or smaller. For example, the ring 46 may have a diameter equal to the maximum diameter of the conical section 14. As a safety measure stops are provided at the inlet vanes 15 so as to prevent the floating ring 46 from dropping into the draft tube 12 as the liquid level drops. Other variations and modifications of the draft tube mixing apparatus shown in FIGS. 1 and 2 will undoubtedly suggest themselves to those skilled in the art.

Referring next to FIGS. 3 and 4, there is shown draft tube mixing apparatus which has multiple operating depths or range of levels which the liquid can have in the tank. For example, two levels, a lower level and an upper level $L_2$ above the floor 60 of the tank are shown for purposes of illustration. Neither the tank nor the draft tube support structure is shown in order to simplify the illustration. A draft tube 62 is vertically arranged in the tank; that is the axis of the tube is vertical. The tube 62 has upper and lower sections 64 and 66. These sections 64 and 66 are coaxial with each other. A passage 68 into the tube 62 is provided between the lower end of the upper section 64 and the upper end of the lower section 66. The upper ends of both sections 64 and 66 may be conical portions 71 and 72. Radially extending guide vanes 74 and 76 are located in the conical portions 70 and 72, respectively. The guide vanes 76 also assist in maintaining the upper and lower section 64 and 66 in concentric relationship. The passage 68 is effectively in the peripherial wall of the draft tube 66 and is below the passages for the circulation of fluid in the draft tube which are at the lower and upper ends thereof.

An impeller 80 is located in the lower section 66 and below the passage 68. This impeller 80 has blades 82, the tips of which extend to a way 84. This construction is described in the above referenced U.S. Pat. No. 3,477,382. Below the impeller at the bottom of the draft tube 62 are a plurality of solids resuspension slots 86, as described in the above referenced U.S. Pat. No. 3,532,327.

The impeller 80 is driven via its shaft 83 so as to cause axial flow in the downward direction through the draft tube 62. The impeller is located so that it is spaced in the direction of flow through the tube from the passage 68.

The diameter of the lower section 66 of the tube 68 is indicated in FIG. 3 as $D_1$ and is larger than the diameter of the upper section 64 of the tube, $D_2$. The axial width or height of the passage 68 is shown in FIG. 3 as "h". These diameters $D_1$ and $D_2$ and the passage height "h" may be selected in order to optimize the flow into the draft tube, both into the upper end and through the passage 68.

FIGS. 5 and 6 show a draft tube arrangement similar to the arrangements shown in FIGS. 3 and 4 and like parts are identified by like numerals. The lower section 88 of the draft tube 62 is of the same diameter as the upper section. In other words, $D_1$ equals $D_2$. The height "h" of the passage 68 is adjusted to provide the selected quantity of flow into the passage 68. The diameter of the upper section 64 can be equal or less than the diameter of the bottom section. By maintaining the ratio of the diameters of the upper and lower sections ($D_2/D_1$) between 0.8 and 1.0, seventy to eighty percent of the flow will be through the upper end of the draft tube 60 and twenty to thirty percent through the passage 68, when the liquid level is $L_2$ or above the upper end of the draft tube 62. When the liquid level falls below the upper end of the draft tube, say to level $L_1$, some forty to fifty percent of the flow through the entire draft tube (viz., the normal pumping capacity of the tube), which is the case when the level was above the upper end of the tube 62, is through the passage 68. Similarly when the upper and lower section 64 and 68 have equal diameters the ratio of the height of the passage to the diameter ($h/D_1$) may be between 1.0 and 0.8. Again seventy to eighty percent of the flow is through the upper end of the draft tube when the liquid level is $L_2$. When the liquid level falls below the upper end (for example is at $L_1$), forty to fifty percent of the normal pumping capacity proceeds to flow through the passage 68. The draft tube arrangement therefore maintains mixing operation even though some process upset or emergency condition causes the level in the tank to fall below the upper end of the draft tube. Mixing also can continue in normal process shut down as the tank is being emptied. Also during process operations at less than full capacity, the draft tube mixer can be operated with less than a full tank of liquid.

Figure 7:
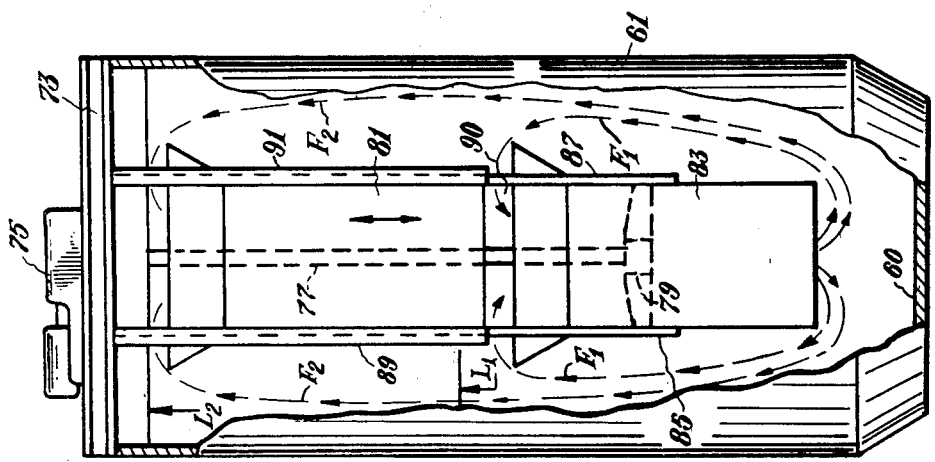
FIG. 7 is a simplified view of mixing apparatus which allows operation at levels above and below the top of a draft tube arrangement which is adjustable so as to allow operation at various liquid levels.

FIG. 7 illustrates a draft tube mixer which can operate at multiple levels. The floor 60 of the tank 61 is shown in FIG. 7. Also shown, schematically as a beam 73, is superstructure on the top of the tank 61. A drive assembly 75 for the shaft 77 of the impeller 79 is carried by the superstructure.

The draft tube includes upper and lower sections 81 and 83. The lower section 83 is fixedly supported on the superstructure 73 by struts 85 and 87. The entire upper section, or a circular cylindrical section thereof, is moveably supported by struts 89 and 91. These struts 89 and 91 may be in telescoping relationship with the struts 85 and 87 which support the lower section 83. Suitable drives such as rack gears on the struts 89 and 91, driven by a worm gear from a motor (not shown) mounted on the superstructure 73, may be used to translate the struts 89 and 91 and the upper section 81 up and down axially so as to open and close the passageway 90 between he lower end of the upper section 81 of the draft tube and the lower section 83 thereof. When the liquid in the tank is the upper level, for example $L_2$ as shown in FIG. 7 the upper section 89 is translated downwardly to close the passage. The flow then is along the dash lines $F_2$ and the draft tube operates normally with 100% of the flow or almost 100% of the flow entering through the upper end and leaving through the bottom end thereof. When the liquid level drops below the upper end of the tube at its maximum downward transversal, as for example when the level is at $L_1$, the upper end 81 of the draft tube arrangement is driven upwardly to open the passage 90 so as to increase the flow through the lower section. The flow then is entirely to the lower section and pumping capacity near normal capacity when the level is above the upper end of the draft tube arrangement is maintained. The liquid in the tank then flows along the path indicated by the dashed lines $F_1$. Various modifications of the draft tube arrangement shown and described herein so as to obtain multiple level operation will suggest themselves to those skilled in the art. The draft tube arrangements shown herein, therefore, should be taken as illustrative.

Figure 8:
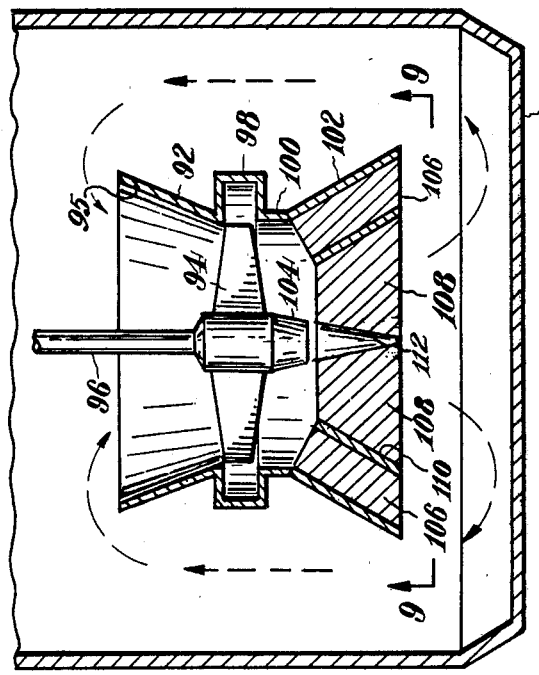
FIG. 8 is a simplified, sectional view of draft tube mixing apparatus having a wide angle diffuser which enables efficient operation even with a short draft tube.
Figure 9:
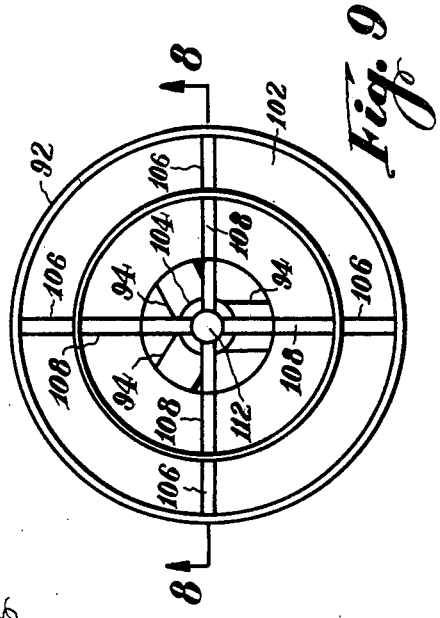
FIG. 9 is a bottom view of the draft tube shown in FIG. 8, the view being taken along the line 9—9 in FIG. 8.

Referring to FIGS. 8 and 9 there is shown draft tube mixing apparatus which enables the use of a relatively shallow tank 90 and a draft tube 92 having a low aspect ratio; the aspect ratio being the length of the draft tube to its diameter, which in the illustrative draft tube shown in FIG. 8, is close to 1. Such short draft tubes are desirable in that they allow the use of shallow tanks or low liquid levels in a tank in which the draft tube is submerged. An another advantage of such low aspect ratio draft tubes is that the impeller thereof may have a large diameter and therefore gains the efficiency, in terms of the ratio of flow to driving power (energy), which is characteristic of large diameter impellers.

The draft tube 92 has an impeller 94 driven by a shaft 96. The superstructure for supporting the impeller 94 and the draft tube is not shown in FIGS. 8 and 9 to simplify the illustration. Similarly the motor and the associated gears for turning the shaft 96 are not shown.

The draft tube 92 has a conical inlet section 95. A way 98 for the axial flow impeller 94 is of the type described in U.S. Pat. No. 3,477,382 which is referenced above. The tips of the blades of the impeller 94 extend to the way 98 and provide a seal between the low and high pressure regions in the draft tube. A cylindrical section 100 under the way 98 is inserted to provide the desired length of the draft tube 92. A wide angle diffuser section 102 constitutes the lower end of the draft tube. The wall of the tube in the diffuser section is conical and it makes a large angle, for example 30 to 35 degrees with the axis of the tube. The total cone angle is then approximately 60 to 70 degrees. It is this wide angle section which enables the draft tube 92 to be short; that is to have a low aspect ratio. This is because the diffuser section 102 recovers the dynamic energy of the jet as it leaves the draft tube. The velocity of the jet is reduced in the diffuser section rapidly so as to enable the flow, the direction of which is shown by the dashed arrows in FIG. 8, to change direction from downward axial flow to radial flow and then back to upward axial flow in the region between the draft tube and the wall of the tank 90. The efficiency of the draft tube apparatus depends upon the velocity of the liquid, since the energy lost by the liquid is proportional to the square of its velocity. The losses in velocity are greatest in the region where the liquid turns, and more than fifty percent of the losses in the system occur in that portion of the jet which makes the turn in reversing direction under the draft tube 92. The diffuser section 102 widens the jet path, and lowers the velocity of the jet. The wide angle diffusion is assisted by the conical termination 104 at the end of the hub of the impeller 94. This conical diffusing cone 104 may be stationary and supported from the draft tube wall, as by the flow straightening vanes 106, 108 within the conical section 102.

A conical member 110 in the form of a frusto-conical tube is disposed within and concentric with the conical wall of the draft tube 92 in the conical section 102. The height or altitude of this frustro conical tube 110 is approximately equal to the height of the wall of the tube 92 in the conical section 102 which is also frustro conical. The vanes 106 support the conical member 110 within the conical section 102. Other flow straightening vanes which change the radial direction or circular flow due to the impeller into axial flow 108 are attached to a continuation 112 of the conical section 104 of the impeller, which is coaxial with the impeller 94.

The conical member 110 splits the flow in the conical section and controls the flow in an axial direction in a manner to prevent separation of the jet from the inside of the outer wall of the tube 92 in the diffuser section 102. Were it not for the conical member 102, the wide angle of the diffuser section would result in a high pressure region along the outer wall 102 and cause separation or detachment of the jet as the jet moves along the outwardly flaring wall of the wide angle diffuser section 102. In this separated region the flow is at very low velocity and causes high losses in energy in the flowing liquid. Accordingly, a separated region would make the draft tube mixer very inefficient. The conical member 102 avoids the problem of detachment of the jet and makes use of the wide angle diffuser 102 practical.

The draft tube apparatus having a wide angle diffuser is shown in FIGS. 8 through 11 in down pumping applications. Up pumping draft tubes may also be provided with a wide angle diffuser at the outlet end of the draft tube. These wide angle diffusers for up pumping draft tubes may be of a design similar to the designs illustrated in FIGS. 8, 9, and 11.

Figure 10:
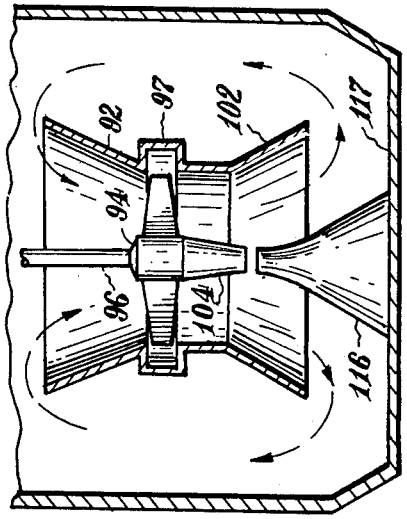
FIG. 10 is a simplified sectional view illustrating a draft tube mixing apparatus similar to FIG. 8 and having a wide angle diffuser of a design different from the diffuser shown in FIG. 8.

FIG. 10 shows a down pumping draft tube mixer, similar to the mixer shown in FIGS. 8 and 9 and like parts are identified by like reference numerals. The conical member in the wide angle diffuser section 102 is provided by a cone 116 which is mounted on the floor 117 of the tank 90. The cone 116 extends into the conical section 102. Radial vanes (not shown) may extend between the conical member 116 and the wall of the draft tube 92 in the conical section 102. These vanes will serve to support the draft tube 92 as well as to straighten the flow from the draft tube by removing any residual radial component thereof.

An ancillary advantage of the arrangement shown in FIG. 10 is that it permits the impeller drive shaft to be extended through the tank bottom. For deep tanks, this permits a shorter shaft to be used than would be the case where the shaft is extended from the top of the tank, as shown.

The wall of the conical member 110 or 116 may be parallel to the wall of the draft tube 92 in the diffuser section 102, if desired.

Figure 11:
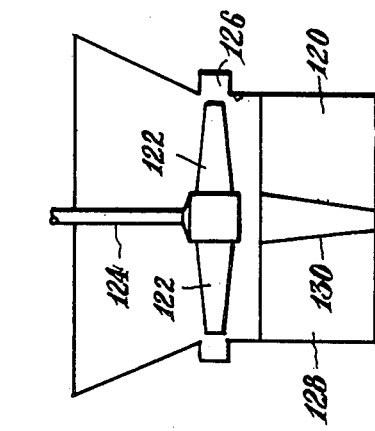
FIG. 11 is a schematic, sectional view of a draft tube having a wide angle diffuser located near the bottom of the tube.

FIG. 11 shows a draft tube 120 of high aspect ratio. This draft tube contains an impeller 122 driven by a shaft 124 and located in an axial way 126. Vanes 128 extend radially from a diffusion cone 130 below the impeller. The walls of this diffusion cone 130 make only a small acute angle for example 7 degrees, with the axis of the tube 120. A wide angle diffuser 132 of a design similar to the diffuser 102 is disposed at the outlet end of the tube 120. The diffuser 132 has a frustro-conical outer shell and a frustro-conical tube 134 which prevents separation of the jet at the outer shell of the tube 120 in the diffuser section 132. Radial vanes 136, similar to the vanes 106, support the splitter cone 134. Other radial vanes 138 similar to the vanes 108 which may form a cross are disposed within the cone 134. Settled solid resuspension slots 140, as described in the above referenced U.S. Pat. No. 3,532,327, may be disposed in the outer shell of the tube in the diffuser section 132 and extend above the diffuser section.

The location of the diffuser section at the outlet end of the draft tube is preferred, however, the diffuser section may be located within the tube. Particularly in a long draft tube, it may replace the diffusion cone 130 and its associated vanes 128. The draft tube then extends below the diffusion section to accommodate the total depth of the tank.

In addition to modifications to provide for up pumping, other modifications in the herein described wide angle diffusion draft tube mixing apparatus will undoubtedly suggest themselves to those skilled in the art. Accordingly, the preferred embodiments shown herein should be taken as illustrative and not limiting.

Referring to FIG. 12, there is shown a tank 150 containing a liquid or liquid particle suspension or slurry with a draft tube 152 submerged therein. An impeller 154 is disposed in the draft tube and drives the liquid therein, as shown by the arrows on the dashed lines in FIG. 12, in an axially upward direction through the tube 152 and axially downward between the tube and the walls of the tank 150. An axial way for the impeller 154, such as shown in above referenced U.S. Pat. No. 3,477,382 is not shown for the sake simplifying the illustration. Similarly, the superstructure for supporting the draft tube and the drive for the impeller 154 is not shown.

The efficiency of up pumping draft tube mixers is adversely affected by a non-uniform flow distribution across the impeller. Flow separation occurs along the inside wall of the draft tube. In some cases, the flow direction may be axially downward instead of upward. The efficiency of the draft tube is adversely affected, even when the impeller is located at the upper end of a large aspect ratio (length equal to several diameters) draft tube. A flow guide 156 is provided to counteract flow separation from the inside walls of the draft tube 152 and provide uniform flow and improved operating efficiency. The flow guide 152 looks generally like a stove pipe hat with the top cut out. It takes flow which may be moving with rapid radial velocity along the bottom of the tank, and assists in changing the direction thereof to provide uniform axial flow in the draft tube.

The flow guide 156 is an annular member having a cylindrical section 158 which is the hollow tube or stove pipe. This section 158 extends into the inlet region at the bottom of the draft tube. The cylindrical section 158 and the rest of the annular member 158 is coaxial with the draft tube 152. A second section of the flow guide extends outward from the draft tube inlet and away from the tube. It is made up of two portions 160 and 162. The portion 160 is a disc which extends outward radially and has a diameter greater than the diameter of the draft tube 152. The section 162 interconnects the disc 160 and the cylinder 158, and is the miter between the brim 160 of the stove pipe and the stove pipe cylinder 158. The conical section 162 is also spaced axially away from the inlet end of the draft tube. As shown, the draft tube and the guide are separate. They may be supported from the superstructure above the tank by means of vanes (not shown) which extend radially between the annular member 156 and the draft tube 152. Other variations and modifications of the guide means will suggest themselves and the herein described embodiment should be taken as illustrative and not in a limiting sense.

Referring to FIG. 13, there is shown draft tube mixer apparatus which is operative to separate coarse and fine particles during the normal operation of the apparatus. In other words, separation of particles suspended in the liquid (viz., in the slurry which is being mixed) in accordance with size is obtained directly from the mixing process and without the need for additional apparatus or utilization of energy. Conservation of energy and improvement of the efficiency of the processes is thereby obtained.

In FIG. 13, a tank 170 contains the liquid and a draft tube 172. The draft tube is shown schematically with an impeller 174 which provides axially downward pumping of the liquid through the tube 172. An arrangement of vanes 174 to restrict the outlet flow from the impeller to axial flow is also schematically shown. The superstructure for supporting the draft tube 172 and the drive for the impeller 174 is not shown.

The flow velocity of the liquid in the tank is illustrated by the vectors shown as arrows of different inclination and length. The inclination of the vectors indicates the direction of the flow and the length of the vectors indicates the magnitude of the flow velocity. The flow pattern is generally radially symmetric. In other words, in each diametral plane through a diameter of the draft tube and the axis thereof, which includes the vertical plane which is shown in FIG. 13, the flow pattern on each side of the axis is the same. Accordingly, the vectors in the diametral plane on the right side of the axis 176 as shown in FIG. 13 illustrates the flow pattern throughout the tank 170. From the vectors, it will be observed that the flow is in opposite direction, namely, downwardly within and upwardly outside the draft tube 172. It will be observed that there are regions 178 and 180 generally below the outlet and above the inlet of the draft tube 172 where the flow changes direction. It has been discovered that fine particles congregate in the upper inlet region 180 where the flow turns, while coarse particles congregate in the lower outlet region 178. These particles are suspended in the liquid and may be part of the slurry which circulates in the tank 170.

The relatively coarse particles are separated by means of a draw pipe 182. The relatively fine particles may be separated by means of another draw pipe 184. These draw pipes are arranged so that their inlets are in the regions 178 and 180. A single draw pipe 182 may be provided when it is the coarse particles that are to be separated. If only fine particles are to be separated only a single draw pipe 184 need be provided. In accordance with the invention, a series of successive stages of mixing tanks as shown in FIG. 13 may be used in a total mixing process. In the illustrated arrangement the fine particles may be drawn off and advanced to the next stage in the process while the coarse particles are recirculated to the previous tank, and, e.g., an inlet pipe 186 may be provided for this purpose. In some applications the coarse particles may be advanced and the fines recirculated. Additional mixing action is then applied to the coarse particles. For example, some processes involve the growth rather than the reduction in size of the suspended particles. In such case, it may the coarse particles which are drawn off from the pipe 182 to the next process step, while the fine particles from the pipe 184 are recirculated through the inlet pipe 186.

Inasmuch as the region 180 is closer to the axis of the draft tube 172 than to region 178, the inlet of the coarse particle carrying draw pipe 182 is disposed radially from the axis 176 a distance greater than the inlet of the pipe 184 which carries the fine particles.

The draft tube 172 is illustrated arranged vertically, that is with its axis vertical in the tank 170. The tank is also illustrated as being a generally cylindrical tank. The impeller 174 is driven to obtain down pumping through the draft tube. Up pumping may be provided in which case the regions 178 and 180 may be displaced. The draw pipes 182 and 184 are then arranged in the regions 178 and 180 where the flow changes direction.

In the down pumping arrangement as illustrated in FIG. 13, the fine carrying draw pipe 184 has its inlet above the plane of the inlet of the draft tube. The inlet of the draw pipe 812 which carries the coarse particles is in a region which extends above and below the plane of the outlet of the draft tube and is near the bottom of the tank.

Single pipes 182 and 184 are shown with their axis parallel to the axis 176. This arrangement and single pipes is preferred for reasons of simplicity. The orientation of the axis of the draw pipes is not critical. The draw pipes may be disposed with their axis other than vertical. Arrays of pipes rather than single pipes may be used. The regions 178 and 180 are annular regions and a plurality of pipes may extend radially through the wall of the draft tube into the annular regions 178 and 180. This array may be in the appearance of a first set of spokes into the region 180 and a second set of spokes into the region 178. Other arrangements of draw pipes may be designed depending upon the means for pumping the suspensions through the pipe. Gravity flow may be preferably due to cost consideration and the effect upon the flow of particles through the draw pipes 182 and 184 in the mixing tank 170. The arrangement illustrated in FIG. 13 and described herein should therefore be taken as illustrative and not in a limiting sense.

I claim:

1. Draft Tube apparatus for use in a tank containing liquid to be mixed which comprises a draft tube disposed in said tank, an impeller in said draft tube for providing axial flow of said liquid therein, flow guide means disposed at the inlet region of said draft tube to change the direction of flow in said region from radially to axially directed flow of generally uniform velocity, said guide means comprising an annular open tubular member spaced from the walls of said tank having a first tubular section at one end thereof extending axially into said draft tube at said inlet, and a second section at the opposite end thereof being in its entirety spaced axially outward from the inlet end of said draft tube and extending outwardly from said draft tube inlet and radially away from said draft tube.

2. The invention as set forth in claim 1 wherein said annular member is shaped generally like a stove pipe hat having a stove pipe and a brim without the top of the stove pipe, said stove pipe section being disposed partially in the inlet of said draft tube and said brim being entirely out of said draft tube.

3. The invention as set forth in claim 2 wherein said brim has a diameter larger than the diameter of said tube.

4. The invention as set forth in claim 3 wherein the miter between said brim and said stove pipe is provided by a conical section which flares radially out from said stove pipe to said brim, said miter section being spaced axially away from said draft tube inlet.

5. The invention as set forth in claim 1 wherein said annular member and draft tube are coaxial with each other, said second section includes a conical portion flaring outward from said first section, said conical portion being spaced axially from said inlet region of said draft tube.

6. The invention as set forth in claim 5 wherein said second section has a disc portion, said disc portion being connected to the end of said conical portion opposite from said first section, the plane of said disc portion being perpendicular to said axis, and the inner and outer diameter of said disc portion being respectively less than and greater than the diameter of said draft tube.

7. The invention as set forth in any of claims 1 through 6 inclusive, wherein said draft tube is disposed vertically in said tank, said impeller providing axially flow upwardly in said draft tube and said annular member, said inlet end of said draft tube is spaced from the bottom of said tank with said annular member in part being disposed between said tank at bottom and said inlet end.

* * * * *